(12) United States Patent
Iwasaki et al.

(10) Patent No.: US 11,052,545 B2
(45) Date of Patent: Jul. 6, 2021

(54) METHOD OF ATTACHING TIP TO PIPETTE

(71) Applicants: KAWASAKI JUKOGYO KABUSHIKI KAISHA, Kobe (JP); SYSMEX CORPORATION, Kobe (JP); MEDICAROID CORPORATION, Kobe (JP)

(72) Inventors: Yukio Iwasaki, Kobe (JP); Satoshi Ouchi, Kobe (JP); Eiji Mitsui, Kobe (JP); Junichi Matsuoka, Kobe (JP); Takehiro Hasegawa, Kobe (JP); Yukihiko Kitano, Kobe (JP)

(73) Assignees: KAWASAKI JUKOGYO KABUSHIKI KAISHA, Kobe (JP); SYSMEX CORPORATION, Kobe (JP); MEDICAROID CORPORATION, Kobe (JP)

( * ) Notice: Subject to any disclaimer, the term of this patent is extended or adjusted under 35 U.S.C. 154(b) by 84 days.

(21) Appl. No.: 16/226,906

(22) Filed: Dec. 20, 2018

(65) Prior Publication Data

US 2019/0193272 A1    Jun. 27, 2019

(30) Foreign Application Priority Data

Dec. 26, 2017   (JP) ............................. JP2017-250233

(51) Int. Cl.
*B25J 11/00*      (2006.01)
*B01L 3/02*       (2006.01)
(Continued)

(52) U.S. Cl.
CPC ........... *B25J 11/005* (2013.01); *B01L 3/0275* (2013.01); *B01L 3/0286* (2013.01); *B23P 19/04* (2013.01);
(Continued)

(58) Field of Classification Search
CPC .... B25J 9/1687; B25J 11/005; B25J 15/0071; B23P 19/10; B23P 19/107; B23P 19/12;
(Continued)

(56) References Cited

U.S. PATENT DOCUMENTS 4,707,907 A * 11/1987 Ivanov ................... B06B 1/186
                                              29/428
5,031,304 A *  7/1991 Shepard ................ B23P 19/102
                                              29/700
(Continued)

FOREIGN PATENT DOCUMENTS

JP            2015-47641 A      3/2015

*Primary Examiner* — Jermie E Cozart
(74) *Attorney, Agent, or Firm* — Metrolex IP Law Group, PLLC

(57) ABSTRACT

A method of attaching a tip to a pipette, which is executed in a robot system, includes: making an end effector of a robot hold a pipette; bringing a vicinity portion of a distal end of the pipette into contact with or close to an edge of an opening formed in a base of a tip while tilting an axis direction of the pipette by a predetermined angle with respect to an axis direction of the tip; attaching the tip to the pipette by inserting the distal end of the pipette and the vicinity portion of the distal end of the pipette into the tip while raising the pipette such that the axis direction of the pipette is aligned with the axis direction of the tip; and separating the pipette and the tip attached to the pipette from the predetermined spot.

6 Claims, 6 Drawing Sheets

(51) Int. Cl.
*G01N 35/00* (2006.01)
*B25J 9/16* (2006.01)
*B23P 19/10* (2006.01)
*B23P 19/12* (2006.01)
*G01N 35/10* (2006.01)
*B23P 19/04* (2006.01)
*B25J 15/00* (2006.01)

(52) U.S. Cl.
CPC ............. *B23P 19/10* (2013.01); *B25J 9/1687* (2013.01); *G01N 35/0099* (2013.01); *G01N 35/1002* (2013.01); *G01N 35/1011* (2013.01); *B01L 2200/025* (2013.01); *B23P 19/107* (2013.01); *B23P 19/12* (2013.01); *B25J 15/0071* (2013.01); *G01N 2035/103* (2013.01)

(58) Field of Classification Search
CPC ............. B01L 3/0275; B01L 2200/025; G01N 35/0099
See application file for complete search history.

(56) References Cited

U.S. PATENT DOCUMENTS

| | | | | |
|---|---|---|---|---|
| 5,207,554 | A * | 5/1993 | Asakawa | B23P 19/102 33/DIG. 13 |
| 5,779,984 | A * | 7/1998 | Kelly | B65D 25/108 206/486 |
| 5,906,795 | A * | 5/1999 | Nakashima | B01L 3/0275 422/509 |
| 6,098,802 | A * | 8/2000 | Asa | B01L 9/543 206/443 |
| 9,346,047 | B2 * | 5/2016 | Miyauchi | G01N 35/10 |
| 2005/0265900 | A1 * | 12/2005 | Gard | B01L 9/543 422/400 |
| 2009/0317303 | A1 * | 12/2009 | Belz | B01L 3/0275 422/400 |
| 2015/0234375 | A1 * | 8/2015 | Takayama | G05B 19/4086 700/187 |

* cited by examiner

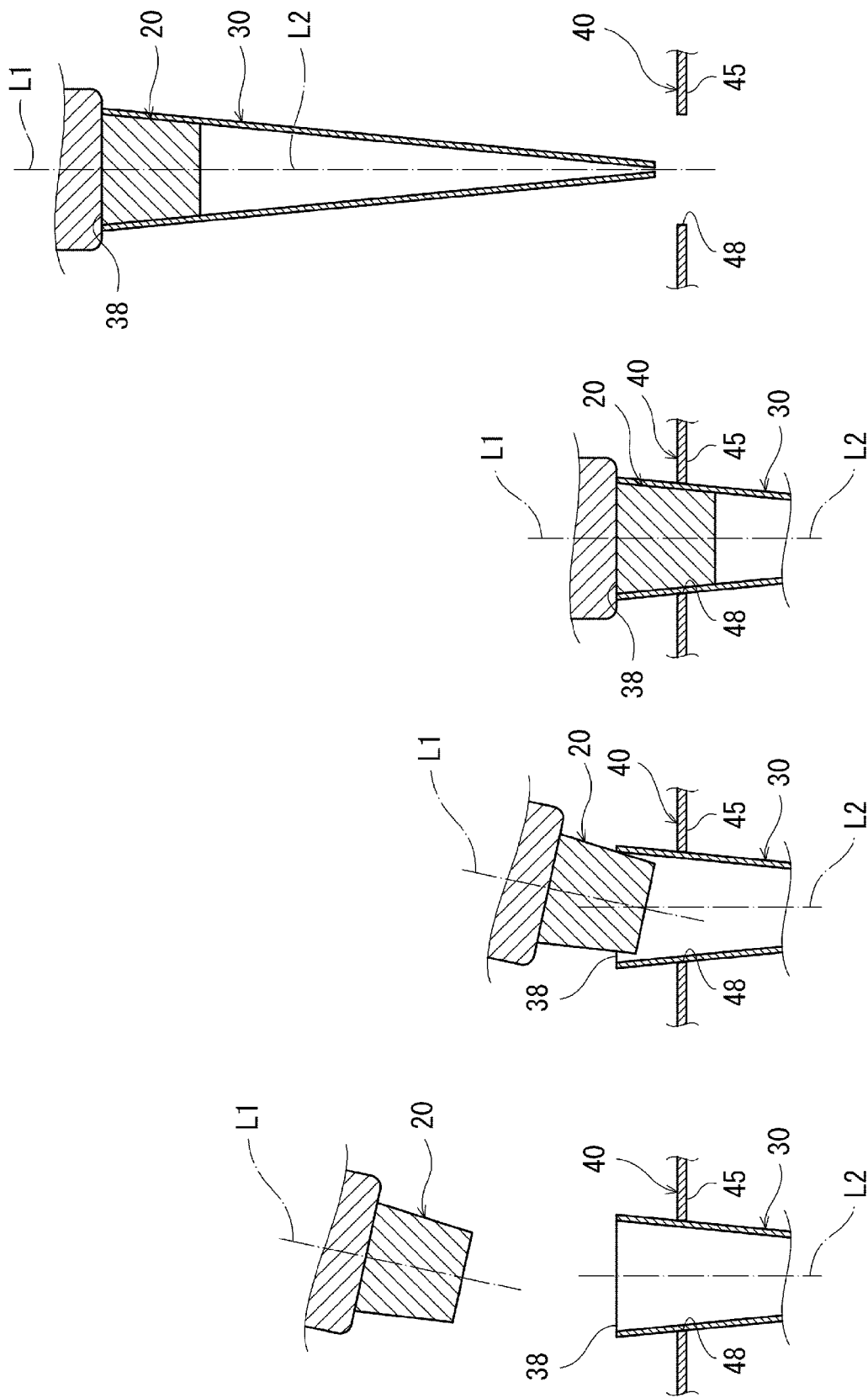

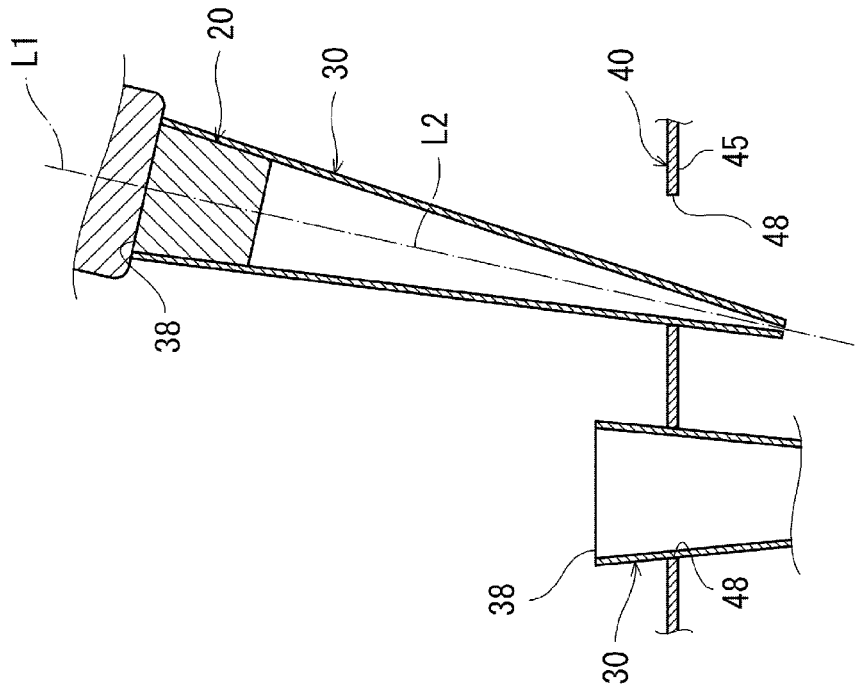
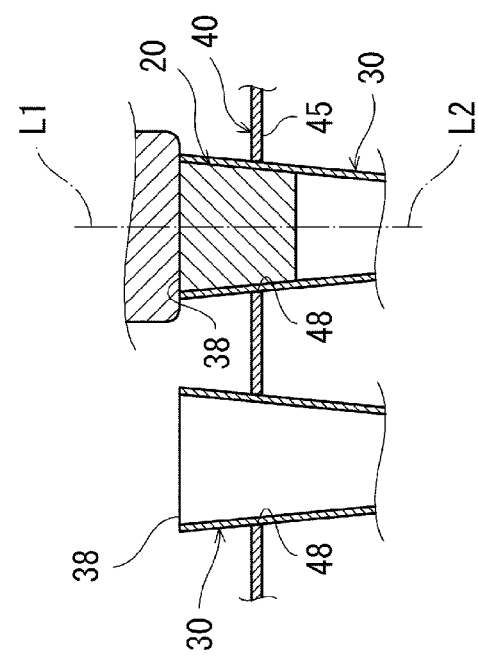
FIG. 4A
FIG. 4B

METHOD OF ATTACHING TIP TO PIPETTE

CROSS REFERENCE TO RELATED APPLICATIONS

This application claims priority based on 35 USC 119 from prior Japanese Patent Application No. 2017-250233 filed on Dec. 26, 2017, entitled "METHOD OF ATTACHING TIP TO PIPETTE", the entire contents of which are incorporated herein by reference.

BACKGROUND

The disclosure relates to a method of attaching a tip to a pipette, more particularly to a method of attaching a tip to a pipette, the method being executed in a robot system.

There has heretofore been known a method of attaching a tip to a pipette, the method being executed in a robot system. Such a method is proposed, for example, in a robot system disclosed in Japanese Patent Application Publication No. 2015-47641 (Patent Literature 1). In Patent Literature 1, a controller controls operations of a robot to attach a pipette tip in a tip box to a distal end of the pipette held by a claw member of a hand.

Incidentally, in the method disclosed in Patent Literature 1 and other related art methods of attaching a tip to a pipette, the methods being executed in a robot system, the pipette is usually held above the tip such that the axis direction of the pipette is aligned with the axis direction of the tip. From this state, the pipette is lowered along the axis direction, and the distal end of the pipette and its vicinity portion are inserted into the tip, thereby attaching the tip to the pipette. However, such a configuration may fail to attach the tip to the pipette.

In view of such a problem, one or more embodiments may provide a method of attaching a tip to a pipette, the method being executed in a robot system and being able to ensure attachment of the tip to the pipette.

SUMMARY

A method according to one or more aspects may be a method of attaching a tip to a pipette, the method being executed in a robot system, wherein the robot system includes: a pipette; a tip positioned in a predetermined spot; and a robot including a robot arm, an end effector attached to a leading end of the robot arm, and a robot controller that controls the robot arm and the end effector to perform operations on the pipette and the tip. The method may include: making the end effector hold the pipette; bringing a vicinity portion of a distal end of the pipette into contact with or close to an edge of an opening formed in a base of the tip while tilting an axis direction of the pipette by a predetermined angle with respect to an axis direction of the tip; attaching the tip to the pipette by inserting the distal end of the pipette and the vicinity portion of the distal end of the pipette into the tip while raising the pipette such that the axis direction of the pipette is aligned with the axis direction of the tip; and separating the pipette and the tip attached to the pipette from the predetermined spot.

A method according to one or more aspects may be a method of attaching a tip to a pipette. The method may include: inserting a pipette held by an end effector attached to a robot arm into an opening of a tip; and further inserting the pipette into the tip after changing tilt of the pipette held by the end effector in a state where the pipette is inserted into the opening of the tip.

BRIEF DESCRIPTION OF DRAWINGS

FIG. 3A is a diagram illustrating a schematic view of a first step of a method of attaching a tip to a pipette according one or more embodiments, FIG. 3B is a diagram illustrating a schematic view of a second step of a method of attaching a tip to a pipette according one or more embodiments, FIG. 3C is a diagram illustrating a schematic view of a third step of a method of attaching a tip to a pipette according one or more embodiments, and FIG. 3D is a diagram illustrating a schematic view of a fourth step of a method of attaching a tip to a pipette according one or more embodiments;

FIGS. 4A and 4B are diagrams illustrating schematic views of a fourth step of a method of attaching a tip to a pipette according to a modification;

DETAILED DESCRIPTION

Figure 1:
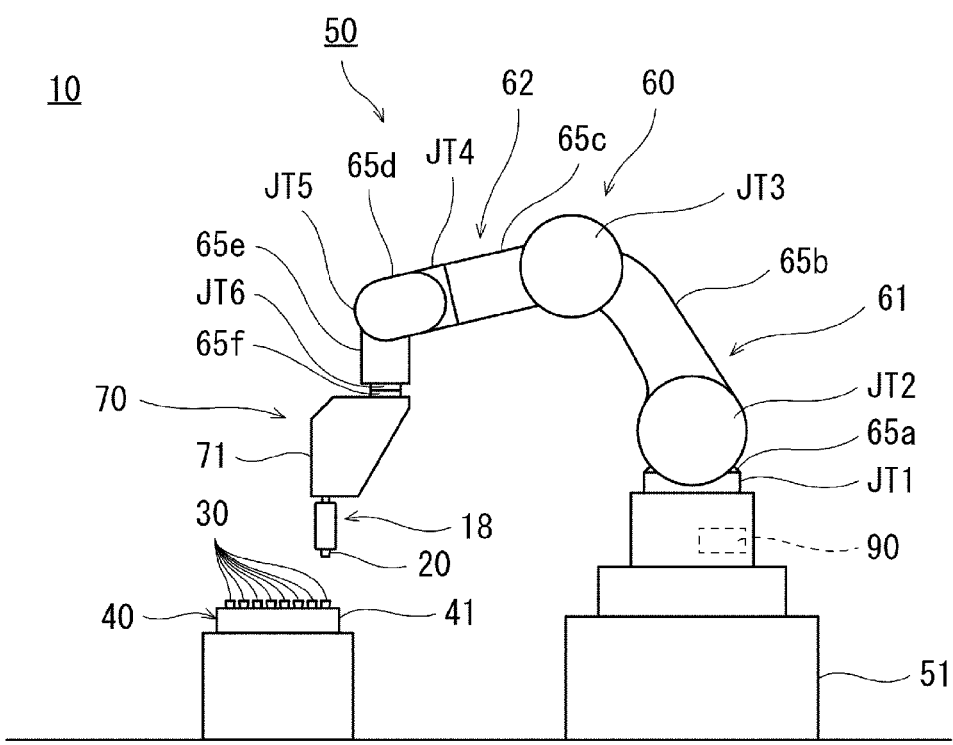
FIG. 1 is a diagram illustrating a schematic view of an overall configuration of a robot system in which a method of attaching a tip to a pipette according to one or more embodiments is executed.

A method of attaching a tip to a pipette according to a first aspect is a method of attaching a tip to a pipette, the method being executed in a robot system, wherein the robot system includes: a pipette; a tip positioned in a predetermined spot; and a robot including a robot arm, an end effector attached to a leading end of the robot arm, and a robot controller that controls the robot arm and the end effector to perform operations on the pipette and the tip, the method including: making the end effector hold the pipette; bringing a vicinity portion of a distal end of the pipette into contact with or close to an edge of an opening formed in a base of the tip while tilting an axis direction of the pipette by a predetermined angle with respect to an axis direction of the tip; attaching the tip to the pipette by inserting the distal end of the pipette and the vicinity portion of the distal end of the pipette into the tip while raising the pipette such that the axis direction of the pipette is aligned with the axis direction of the tip; and separating the pipette and the tip attached to the pipette from the predetermined spot.

According to the above configuration, the distal end of the pipette and its vicinity portion are inserted into the tip after bringing the vicinity portion of the distal end of the pipette into contact with or close to the edge of the opening formed at the base of the tip, thereby preventing failure to attach the tip to the pipette. As a result, the method of attaching a tip to a pipette according to a first aspect is executed in the robot system and can ensure attachment of the tip to the pipette.

The robot system further may include another tip in a spot adjacent or close to the predetermined spot, and the separating the pipette and the tip may include separating the pipette and the tip attached to the pipette from the predetermined spot such that the pipette and the tip attached to the pipette get away from the another tip in an arrangement direction of the another tip and the tip attached to the pipette.

According to the above configuration, another tip can be prevented from adhering to the tip attached to the pipette when the pipette and the tip attached thereto are separated from the predetermined spot.

The method of attaching a tip to a pipette may further include vibrating the pipette and the tip attached to the pipette after the separating the pipette and the tip is performed.

According to the above configuration, even if another tip adheres to the tip attached to the pipette when the pipette and the tip attached thereto are separated from the predetermined spot, such a tip can be shaken off from the tip attached to the pipette.

At least a point of the tip and a vicinity portion of the point of the tip may be of a hollow conical shape whose diameter increases from the point to the base, and the robot system may further include a jig that has certain hardness and includes a hole extending therein, the hole including an opening whose diameter is smaller than that of a base of the conical shape. The method of attaching a tip to a pipette may further include pressing a part of an outer surface of the tip against an edge of the opening of the hole extending in the jig by inserting the tip attached to the pipette into the hole extending in the jig from the point side of the tip, after the making the end effector hold the pipette, the bringing the vicinity portion of the distal end of the pipette, the attaching the tip to the pipette, and the separating the pipette and the tip are performed.

The above configuration can increase the effects achieved by the disclosure.

A method of attaching a tip to a pipette according to a second aspect is a method of attaching a tip to a pipette, including: inserting a pipette held by an end effector attached to a robot arm into an opening of a tip; and further inserting the pipette into the tip after changing tilt of the pipette held by the end effector in a state where the pipette is inserted into the opening of the tip.

The tip may be inserted into a hole extending in a jig in a state where the pipette is inserted into the tip.

The method of attaching a tip to a pipette according to a second aspect is executed in the robot system and can ensure attachment of the tip to the pipette.

Embodiments are explained with referring to drawings. In the respective drawings referenced herein, the same constituents are designated by the same reference numerals and duplicate explanation concerning the same constituents may be omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

(Overall Configuration)

With reference to the drawings, description is given below of a method of attaching a tip to a pipette according to one or more embodiments. Note that these embodiments do not limit the invention.

(Robot System 10)

FIG. 1 is a schematic view illustrating an overall configuration of a robot system in which a method of attaching a tip to a pipette according to one or more embodiments is executed. A robot system 10 according to one or more embodiments is used to automate enzyme-linked immunosorbent assay (ELISA) that has heretofore been manually performed, for example. Here, generally speaking, ELISA is assay to detect and quantify a target antigen and the like contained in a specimen by dispensing reagents and the like to cause antigen-antibody reaction. The method of attaching a tip to a pipette according to one or more embodiments is executed before a dispensing step for ELISA is performed in the robot system 10.

As illustrated in FIG. 1, the robot system 10 includes an 8-channel pipette 18 (multichannel pipette), tips 30 positioned in a predetermined spot, and a robot 50.

(Robot 50)

The robot 50 includes a base 51, a robot arm 60 connected to the base 51, an end effector 70 attached to a leading end of the robot arm 60, and a robot controller 90 that performs operations on the 8-channel pipette 18 and the tips 30 by controlling the robot arm 60 and the end effector 70.

(Robot Arm 60)

As illustrated in FIG. 1, the robot arm 60 is a multi-joint arm that includes six joints JT1 to JT6 and six links 65a to 65f sequentially connected by the joints JT1 to JT6. The joints JT1 to JT6 of the robot arm 60 each include a motor and an encoder.

A connected body of the links and joints including the first joint JT1, the first link 65a, the second joint JT2, the second link 65b, the third joint JT3, and the third link 65c serves as a first arm section 61 of the robot arm 60. To be more specific, the first joint JT1 connects the base 51 to a base end of the first link 65a in a rotatable manner about an axis extending in a vertical direction. The second joint JT2 connects a leading end of the first link 65a to a base end of the second link 65b in a rotatable manner about an axis extending in a horizontal direction. The third joint JT3 connects a leading end of the second link 65b to a base end of the third link 65c in a rotatable manner about an axis extending in the horizontal direction.

A connected body of the links and joints including the fourth joint JT4, the fourth link 65d, the fifth joint JT5, the fifth link 65e, the sixth joint JT6, and the sixth link 65f serves as a second arm section 62 of the robot arm 60. To be more specific, the fourth joint JT4 connects a leading end of the third link 65c to a base end of the fourth link 65d in a rotatable manner about an axis extending in a longitudinal direction of the third link 65c. The fifth joint JT5 connects a leading end of the fourth link 65d to a base end of the fifth link 65e in a rotatable manner about an axis extending in a direction orthogonal to a longitudinal direction of the fourth link 65d. The sixth joint JT6 connects a leading end of the fifth link 65e to a base end of the sixth link 65f in a torsionally rotatable manner. Then, the end effector 70 is attached to a leading end of the sixth link 65f.

End Effector 70

The end effector 70 includes a pipette holder 71 that holds the 8-channel pipette 18 and a pusher (not illustrated) that pushes a plunger of the 8-channel pipette 18 held by the pipette holder 71. The end effector 70 according to one or more embodiments holds the 8-channel pipette 18, thereby holding 8 channels (hereinafter referred to as the "pipettes 20" to avoid complicated description).

Robot Controller 90

A specific configuration of the robot controller 90 is not particularly limited. For example, the robot controller 90 may have a configuration realized by a publicly known processor (such as a CPU) operating according to a program stored in a storage unit (memory). The robot controller 90 executes the method of attaching a tip to a pipette according to one or more embodiments by controlling operations of the robot arm 60 based on pre-stored coordinate information and the like regarding distal ends of the pipettes 20 held by the end effector 70.

Pipette 20

Figure 2A:
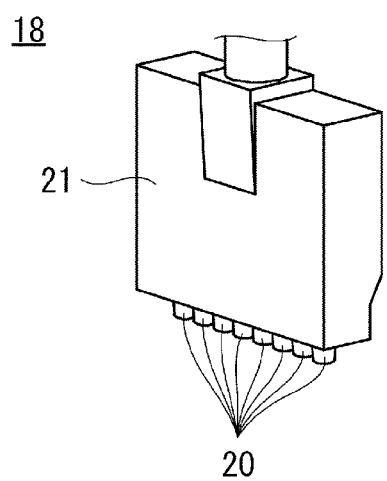
FIGS. 2A and 2B are diagrams illustrating external perspective views of an 8-channel pipette used in a method of attaching a tip to a pipette according to one or more embodiments.
Figure 2B:
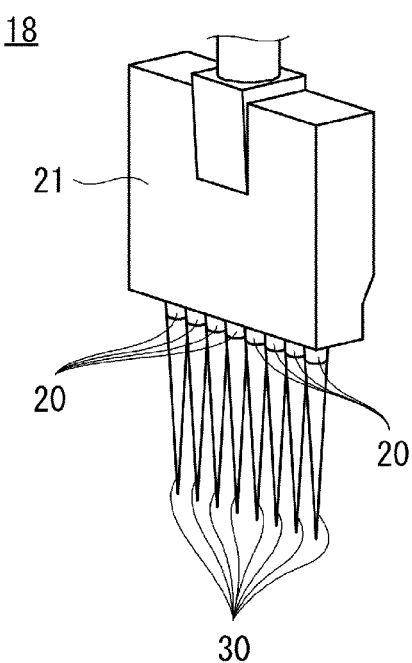

FIGS. 2A and 2B are external perspective views illustrating the 8-channel pipette used in the method of attaching a tip to a pipette according to one or more embodiments, FIG. 2A illustrating a state before the tip is attached and FIG. 2B illustrating a state after the tip is attached. As illustrated in FIGS. 2A and 2B, the 8-channel pipette 18 includes the eight pipettes 20, a housing 21 that houses central portions of the eight pipettes 20, and the plunger (not illustrated) provided at an upper end of a member extending upward from a top surface of the housing 21. The 8-channel pipette 18 is configured to aspirate the liquid such as a reagent into the tips 30 attached to the eight pipettes 20 or to discharge the liquid aspirated into the tips 30 by having the plunger pushed by the pusher of the end effector 70.

The 8-channel pipette 18 may further include a tip injector (not illustrated) to remove the tips 30 attached to the pipettes 20, an injector button (not illustrated) to activate the tip injector, and an amount setting scale (not illustrated) to set the amount of the liquid to be aspirated into the tips 30.

Tip 30

As for each of the tips 30 according to one or more embodiments, at least a point or distal end thereof and its vicinity portion have a hollow conical shape having its diameter increase from the point to the base or proximal end (see FIG. 2B and the like). The tip 30 has an opening 38 formed at its base end, and is attached to the pipette 20 by inserting the distal end portion of the pipette 20 from the opening 38. In one or more embodiments, as illustrated in FIG. 1, the robot system 10 further includes a rack 40 in which the tips 30 are arranged.

The rack 40 includes: a rack main body 41 (see FIG. 1) having a hollow rectangular parallelepiped shape with an opening formed in its top surface; and a rack flat plate 45 (see FIGS. 3A to 3D) horizontally extending in a central portion of an internal space of the rack main body 41 in its height direction. Therefore, a portion of the internal space of the rack main body 41, which is positioned below the rack flat plate 45, is covered with the rack flat plate 45.

The rack flat plate 45 has circular holes 48 extending therein in a plan view. Eight holes 48 are drilled at regular intervals in the page far-near direction of FIG. 1. The intervals are equal to or approximately equal to the intervals between the eight pipettes 20 provided in the 8-channel pipette 18. Moreover, in one or more embodiments, eight sets of the eight holes 48 are provided in the left-right direction in FIG. 1. Therefore, in one or more embodiments, sixty-four (64) tips 30 in total are arranged in the rack 40. The diameter of each of the holes 48 extending in the rack flat plate 45 is smaller than that of the base of the tip 30. Therefore, when the tip 30 is inserted into each of the holes 48 from its point side, a part of the outer surface of the tip 30 comes into contact with the edge of the hole 48, and thus the tip 30 is positioned (see FIGS. 3A to 3C). More specifically, in one or more embodiments, the holes 48 extending in the rack flat plate 45 are predetermined spots to arrange the tips 30.

Method of Inserting Pipette into Tip

With reference mainly to FIGS. 3A to 3D, description is given of an example of a method of inserting a pipette into a tip according to one or more embodiments executed in the robot system 10 described above. FIGS. 3A to 3D are schematic views illustrating first to fourth steps of the method of attaching a tip to a pipette according to one or more embodiments, FIG. 3A illustrating the first step, FIG. 3B illustrating the second step, FIG. 3C illustrating the third step, and FIG. 3D illustrating the fourth step.

First Step

First, as illustrated in FIG. 3A, the end effector 70 holds the pipettes 20. In one or more embodiments, the pipette holder 71 of the end effector 70 holds the 8-channel pipette 18, thereby allowing the end effector 70 to hold the eight pipettes 20. Note that FIG. 3A illustrates a case where an axis direction L1 of the pipette 20 is tilted by a predetermined angle with respect to an axis direction L2 of the tip 30. However, at this point, the end effector 70 may hold the pipette 20 such that the axis direction L1 is aligned with the axis direction L2 (that is, the axis direction L1 of the pipette 20 extends along the vertical direction), for example. The first step is thus performed in one or more embodiments.

Second Step

Next, as illustrated in FIG. 3B, the vicinity portion of the distal end of the pipette 20 is brought into contact with or close to the edge of the opening 38 formed in the base of the tip 30 while tilting the axis direction L1 of the pipette 20 by a predetermined angle with respect to the axis direction L2 of the tip 30. Here, as illustrated in FIG. 3B, above the tip 30, the horizontal position of the pipette 20 is aligned with the predetermined spot to arrange the tip 30 and, while tilting, in that position, the axis direction L1 of the pipette 20 by a predetermined angle with respect to the axis direction L2 of the tip 30, the pipette 20 is lowered along the vertical direction to bring the vicinity portion of the distal end of the pipette 20 into contact with or close to the edge of the opening 38 formed in the base of the tip 30. The second step is thus performed in one or more embodiments.

Third Step

Then, as illustrated in FIG. 3C, the tip 30 is attached to the pipette 20 by inserting the distal end of the pipette 20 and its vicinity portion into the tip 30 while raising the pipette 20 so that the axis direction L1 of the pipette 20 is aligned with the axis direction L2 of the tip 30. The third step is thus performed in one or more embodiments.

Fourth Step

Lastly, as illustrated in FIG. 3D, the pipette 20 and the tip 30 attached thereto are separated from the hole 48 (predetermined spot) extending in the rack flat plate 45.

Here, as illustrated in FIG. 3D, the pipette 20 and the tip 30 attached thereto are separated from the hole 48 by being lifted along the vertical direction. The fourth step is thus performed in one or more embodiments.

As described above, the method of attaching a tip to a pipette according to one or more embodiments can be executed in the robot system 10.

Advantageous Effects

As in the related art method, for example, when the pipette 20 is held above the tip 30 such that the axis direction L1 of the pipette 20 is aligned with the axis direction L2 of the tip 30 and the pipette 20 is lowered along the axis directions L1 and L2 from that state, the distal end of the pipette 20 can come into contact with the edge of the opening 38 in the tip 30. For this reason, in the related art method of attaching a tip to a pipette, the pipette 20 cannot be inserted into the opening 38 formed in the base of the tip 30, leading to failure to attach the tip 30 to the pipette 20.

In the method of attaching a tip to a pipette according to one or more embodiments, on the other hand, the distal end of the pipette 20 and its vicinity portion are inserted into the tip 30 after the vicinity portion of the distal end of the pipette 20 is brought into contact with or close to the edge of the opening 38 formed in the base of the tip 30. In other words, the pipette 20 held by the end effector 70 attached to the robot arm 60 is inserted into the opening 38 in the tip 30, and the pipette 20 is inserted further into the tip 30 after the tilt of the pipette 20 held by the end effector 70 is changed in the state where the pipette 20 is inserted into the opening 38 in the tip 30. Thus, the method of attaching a tip to a pipette according to one or more embodiments can prevent the distal end of the pipette 20 from coming into contact with the edge of the opening 38 in the tip 30. Moreover, increased invitation into the tip 30 widens the acceptable range for insertion of the pipette 20 into the opening 38 of the tip 30. Therefore, failure to attach the tip 30 to the pipette 20 does not occur. As a result, the method of attaching a tip to a pipette according to one or more embodiments is executed in the robot system 10 and can ensure attachment of the tip 30 to the pipette 20.

Modification

From the above description, many variations and other embodiments of the disclosure will be apparent to one skilled in the art. Therefore, the above description is to be construed as illustrative only, and is provided to teach one skilled in the art the best mode of implementing the invention. Details of the structures and/or functions can be substantially changed without departing from the spirit of the invention.

Fourth Step

As in the case of the above embodiments, when the pipettes 20 are arranged not only in the page near-far direction of FIG. 1 (that is, the same direction as the direction in which the eight pipettes 20 in the 8-channel pipette 18 are arranged) but also in the left-right direction of FIG. 1, the fourth step may be performed as illustrated in FIGS. 4A and 4B. FIGS. 4A and 4B are schematic views illustrating a fourth step of a method of attaching a tip to a pipette according to a modification, FIG. 4A illustrating a state after the third step is performed and FIG. 4B illustrating how the fourth step is performed.

Specifically, when the robot system 10 further includes another tip 30 in a spot adjacent or close to the hole 48 (predetermined spot) in the rack flat plate 45 in which the tip 30 to be attached to the pipette 20 is arranged, the pipette 20 and the tip 30 attached thereto may be separated from the hole 48 (predetermined spot) in the rack flat plate 45 so as to get away from another tip 30 (that is, to the right in FIGS. 4A and 4B) in the arrangement direction of another tip 30 and the tip 30 attached to the pipette 20 (that is, the left-right direction in FIGS. 4A and 4B). Thus, another tip 30 can be prevented from adhering to the tip 30 attached to the pipette 20 due to static electricity and the like when the pipette 20 and the tip 30 attached thereto are separated from the hole 48 in the rack flat plate 45.

Fifth Step

Figure 5A:
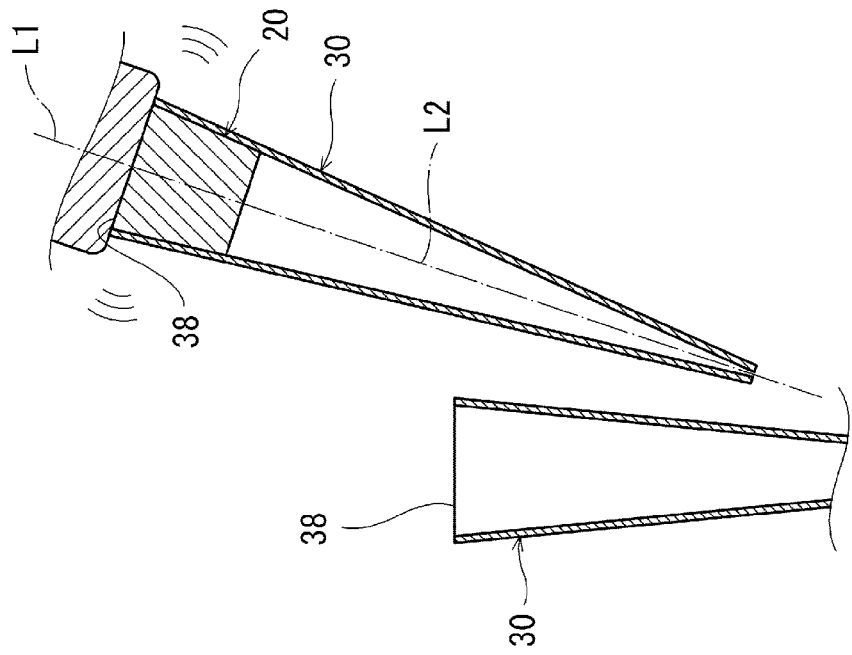
FIGS. 5A and 5B are diagrams illustrating schematic views of a fifth step of a method of attaching a tip to a pipette according to modification.
Figure 5B:
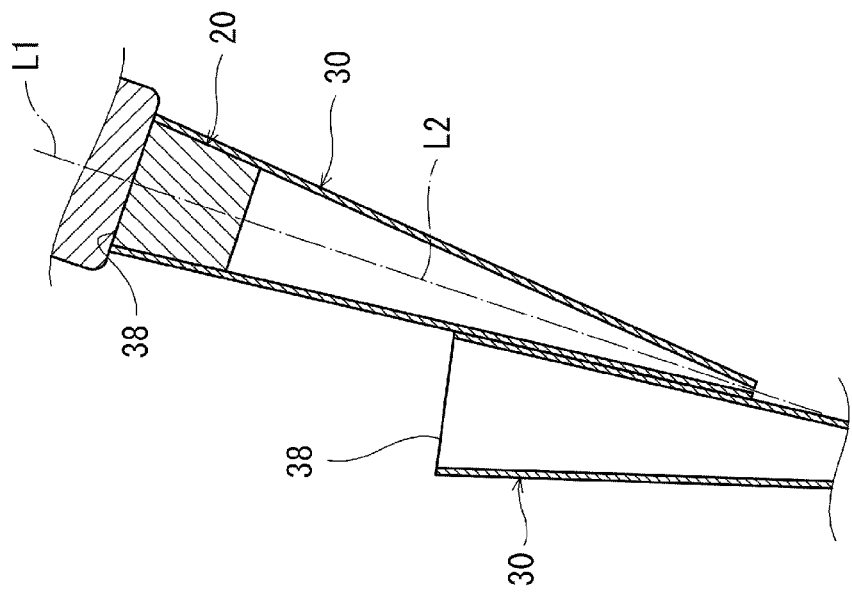

The method of attaching a tip to a pipette according to one or more embodiments may further include a fifth step of vibrating the pipette 20 and the tip 30 attached thereto after the fourth step is performed. FIGS. 5A and 5B are schematic views illustrating the fifth step of the method of attaching a tip to a pipette according to a modification, FIG. 5A illustrating a state after the fourth step is performed and FIG. 5B illustrating how the fifth step is performed. As illustrated in FIG. 5A, for example, even if another tip 30 adheres to the tip 30 attached to the pipette 20 due to static electricity and the like when the tip 30 attached to the pipette 20 is separated from the hole 48 (predetermined spot) in the rack flat plate 45, such a tip can be shaken off from the tip 30 attached to the pipette 20 by performing the fifth step as illustrated in FIG. 5B.

Sixth Step

Figure 6:
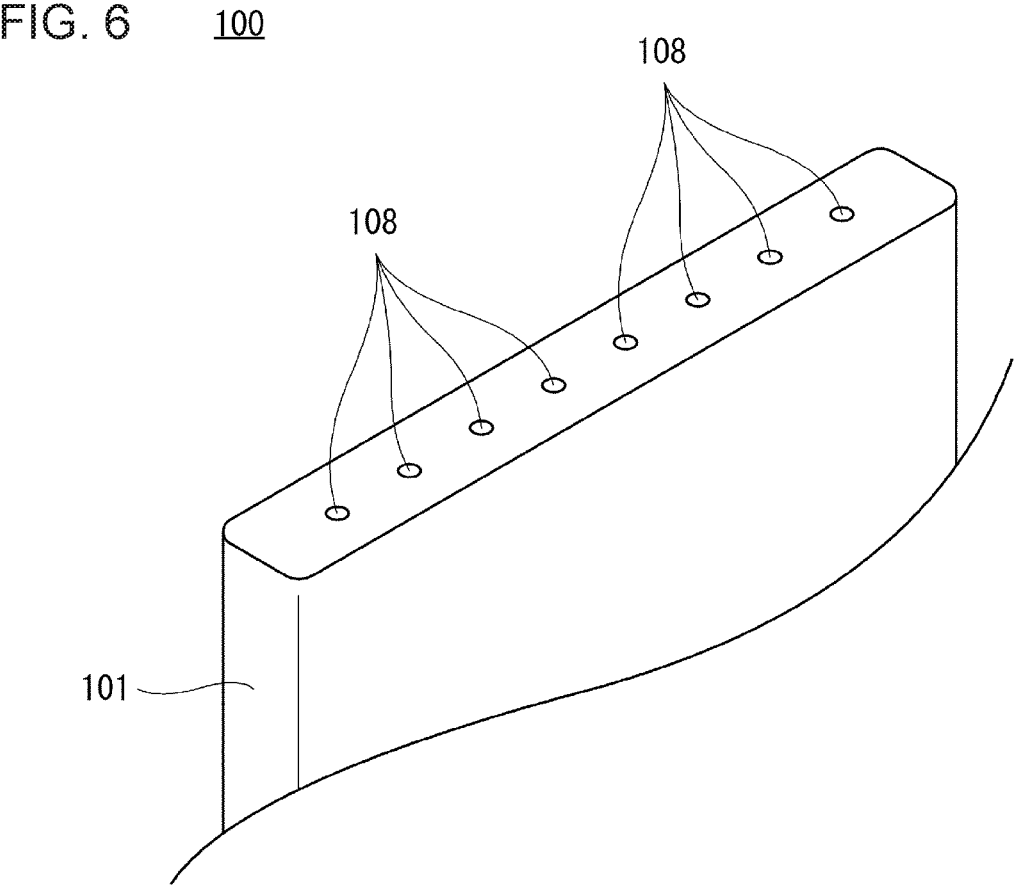
FIG. 6 is a diagram illustrating an external perspective view of a jig used in a sixth step of a method of attaching a tip to a pipette according to modification.

When at least the point of the tip 30 and its vicinity portion have a hollow conical shape whose diameter increases from the point to the base as in the case of the above embodiments, the robot system 10 may further include a jig 100 with predetermined hardness, which has holes 108 extending therein. Each of the holes 108 has an opening whose diameter is smaller than that of a base of the conical shape. FIG. 6 is an external perspective view illustrating a jig used in a sixth step of the method of attaching a tip to a pipette according to a modification. For example, the jig 100 may have a configuration in which eight holes 108 are drilled in a top surface of a stainless-steel jig main body 101 formed into a rectangular parallelepiped shape. The eight holes 108 are drilled at approximately the same intervals as those of the eight pipettes 20 provided in the 8-channel pipette 18 described in the above embodiments. Note that the holes 108 may be provided so as to penetrate to the bottom surface of the jig main body 101, or may be provided to the central portion of the jig main body 101.

Figure 7A:
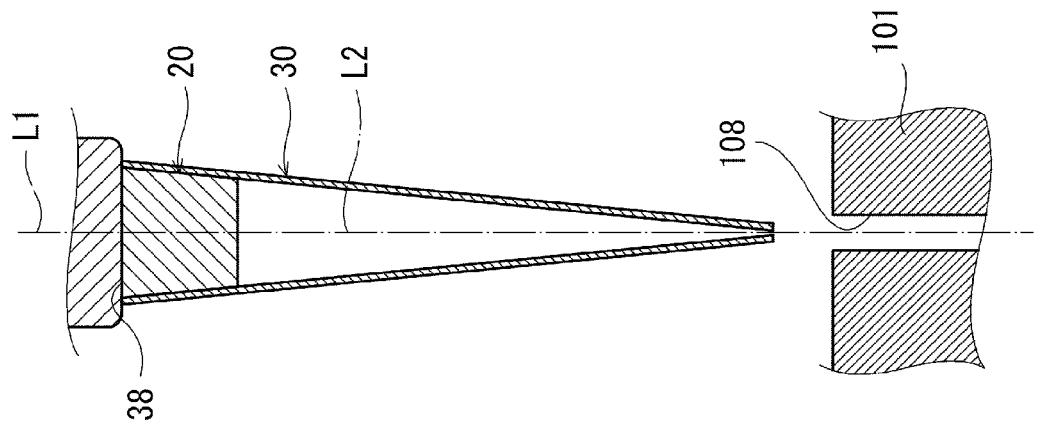
FIGS. 7A to 7C are diagrams illustrating schematic views of a sixth step of a method of attaching a tip to a pipette according to modification.
Figure 7B:
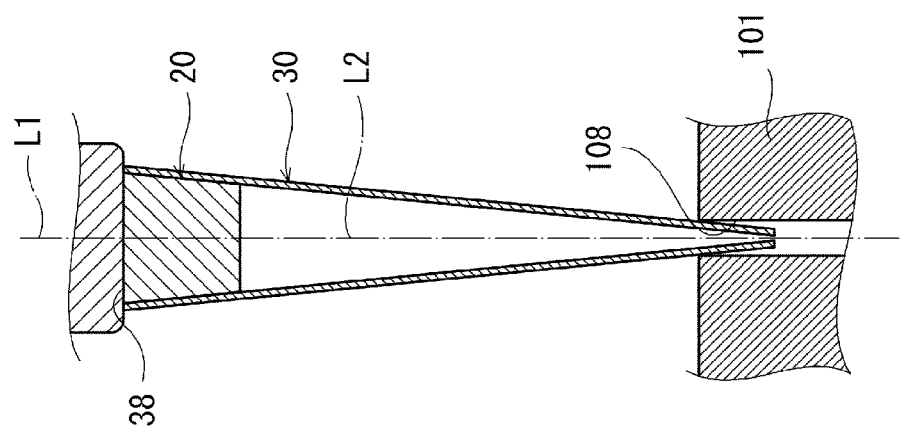
Figure 7C:
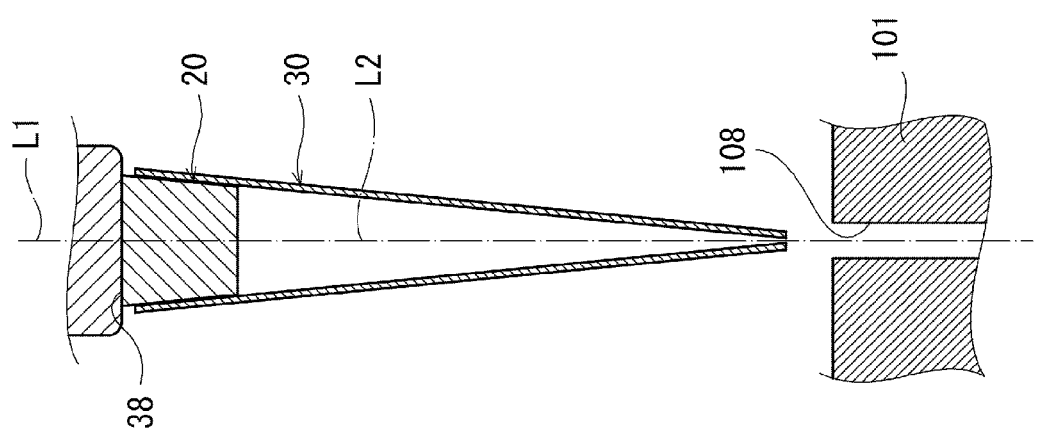

FIGS. 7A to 7C are schematic views illustrating the sixth step of the method of attaching a tip to a pipette according to a modification. FIG. 7A illustrates a state where the pipette is held above the jig so that the axis direction of the tip attached to the pipette is aligned with the axis direction of the hole extending in the jig. FIG. 7B illustrates a state where a part of the outer surface of the tip is pressed against the edge of the opening of the hole extending in the jig. FIG. 7C illustrates a state where the pipette and the tip attached thereto are separated from the hole extending in the jig.

As illustrated in FIGS. 7A to 7C, in the method of attaching a tip to a pipette according to one or more embodiments, the tip 30 may be inserted into the hole 108 extending in the jig 100 in a state where the pipette 20 is inserted into the tip 30. To be more specific, the method of attaching a tip to a pipette may further include a sixth step of pressing a part of the outer surface of the tip 30 against the edge of the opening of the hole 108 by inserting the tip 30 attached to the pipette 20 into the hole 108 extending in the jig 100 from the point side of the tip 30, after at least the first to fourth steps are performed. Thus, the inner surface of the tip 30 is pressed against the outer surface of the pipette 20. Therefore, the attachment of the tip 30 to the pipette 20 can be completed if the tip 30 is not completely attached to the pipette 20. The above configuration can increase the effects achieved by the disclosure.

In the above embodiments, the description is given of the case where the end effector 70 holds the 8-channel pipette 18. However, the invention is not limited thereto. More specifically, the end effector 70 may hold a single-channel pipette (or one pipette 20) or may hold a multi-channel pipette other than the 8-channel pipette (that is, a multi-channel pipette with two to seven channels or a multi-channel pipette with nine or more channels). The robot system 10 may include the tip or tips 30 arranged in the page near-far direction of FIG. 1 corresponding to the one pipette 20 or the number of channels (that is, pipettes 20) included in the multi-channel pipette.

In the above embodiments, the description is given of the case where the robot arm 60 is the multi-joint arm with a six-axis structure. However, the invention is not limited thereto. More specifically, the robot arm 60 may be a multi-joint arm with at least one axis or may be a multi-joint arm with a seven-axis structure. Alternatively, the robot arm 60 may be an arm with a linear-motion axis.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A method of attaching a tip to a pipette, the method being executed in a robot system, wherein the robot system comprises: a pipette; a tip positioned in a predetermined spot; and a robot including a robot arm, an end effector attached to a leading end of the robot arm, and a robot controller that controls the robot arm and the end effector to perform operations on the pipette and the tip, the method comprising:
   making the end effector hold the pipette;
   bringing a vicinity portion of a distal end of the pipette into contact with or close to an edge of an opening formed in a base of the tip while tilting an axis direction of the pipette by a predetermined angle with respect to an axis direction of the tip;
   attaching the tip to the pipette by inserting the distal end of the pipette and the vicinity portion of the distal end of the pipette into the tip while raising the pipette such that the axis direction of the pipette is aligned with the axis direction of the tip; and
   separating the pipette and the tip attached to the pipette from the predetermined spot.

2. The method of attaching a tip to a pipette according to claim 1, wherein
   the robot system further comprises another tip in a spot adjacent or close to the predetermined spot, and
   the separating the pipette and the tip comprises separating the pipette and the tip attached to the pipette from the predetermined spot such that the pipette and the tip attached to the pipette get away from the another tip in an arrangement direction of the another tip and the tip attached to the pipette.

3. The method of attaching a tip to a pipette according to claim 2, the method further comprising:
   vibrating the pipette and the tip attached to the pipette after the separating the pipette and the tip is performed.

4. The method of attaching a tip to a pipette according to claim 1, wherein
   at least a point of the tip and a vicinity portion of the point of the tip are of a hollow conical shape whose diameter increases from the point to the base of the tip, and the robot system further comprises a jig that has certain hardness and includes a hole extending therein, the hole including an opening whose diameter is smaller than that of a base of the conical shape, the method further comprising:
   pressing a part of an outer surface of the tip against an edge of the opening of the hole extending in the jig by inserting the tip attached to the pipette into the hole extending in the jig from the point side of the tip, after the making the end effector hold the pipette, the bringing the vicinity portion of the distal end of the pipette, the attaching the tip to the pipette, and the separating the pipette and the tip are performed.

5. A method of attaching a tip to a pipette, comprising:
   inserting a pipette held by an end effector attached to a robot arm into an opening of a tip; and
   attaching the tip to the pipette by further inserting the pipette into the opening of the tip while changing tilt of the pipette held by the end effector such that an axis direction of the pipette is aligned with an axis direction of the tip.

6. The method of attaching a tip to a pipette according to claim 5, wherein
   the tip is inserted into a hole extending in a jig in a state where the pipette is inserted into the tip.

* * * * *